Dec. 17, 1935.  E. J. VON PEIN  2,024,315
SCALE
Filed May 19, 1933  2 Sheets-Sheet 1

INVENTOR-
Edward J. Von Pein
BY
A. C. Mosby
ATTORNEY

Dec. 17, 1935.   E. J. VON PEIN   2,024,315
SCALE
Filed May 19, 1933   2 Sheets-Sheet 2

INVENTOR
Edward J. Von Pein
BY
A. O'Mahy
ATTORNEY

Patented Dec. 17, 1935

2,024,315

UNITED STATES PATENT OFFICE 2,024,315

SCALE

Edward J. Von Pein, Dayton, Ohio, assignor, by mesne assignments, to The Hobart Manufacturing Company, Troy, Ohio, a corporation of Ohio Application May 19, 1933, Serial No. 671,848

17 Claims. (Cl. 88—1)

This case relates to the type of scale used on the counters of retail stores for weighing and computing the value of an article. In particular, the case is directed to such scales as employ a cylinder or drum chart moved by the weight and having parallel circumferential columns of value indications; each column figured on a different rate or unit price per pound. The drum chart is enclosed in a housing which has a sight opening lengthwise of the chart and usually furnished with a cylinder lens for magnifying the chart indications vertically. It is also desirable to magnify the chart readings horizontally to enable more value columns to be provided on the chart without loss of reading power. The only practical way in which horizontal magnification of the drum chart has been effected is by means of a movable spherically ground lens which is shifted along the sight window to read different columns. This has considerable advantages but of course entails manipulation of the movable lens by the merchant which takes time and requires care in finding the proper location of the lens. In retail stores, as a rule, the merchant does not have the time to make careful adjustments of the movable lens and may find the use of such movable horizontal magnifying means inexpedient and bothersome.

Accordingly, the objects of the present invention are to provide a novel means for horizontally as well as vertically magnifying the indications of a chart; to provide such means as will require no manipulation; and also to provide such means as will be practical for giving a clear universally magnified virtual image of the entire length of the chart thus enabling the columns to be placed side by side without any gaps between them.

Further and other objects and advantages will be hereinafter set forth in the accompanying specification and claims, and shown in the drawings, which by way of illustration show what is now considered to be the preferred embodiment of the invention.

Figure 1:
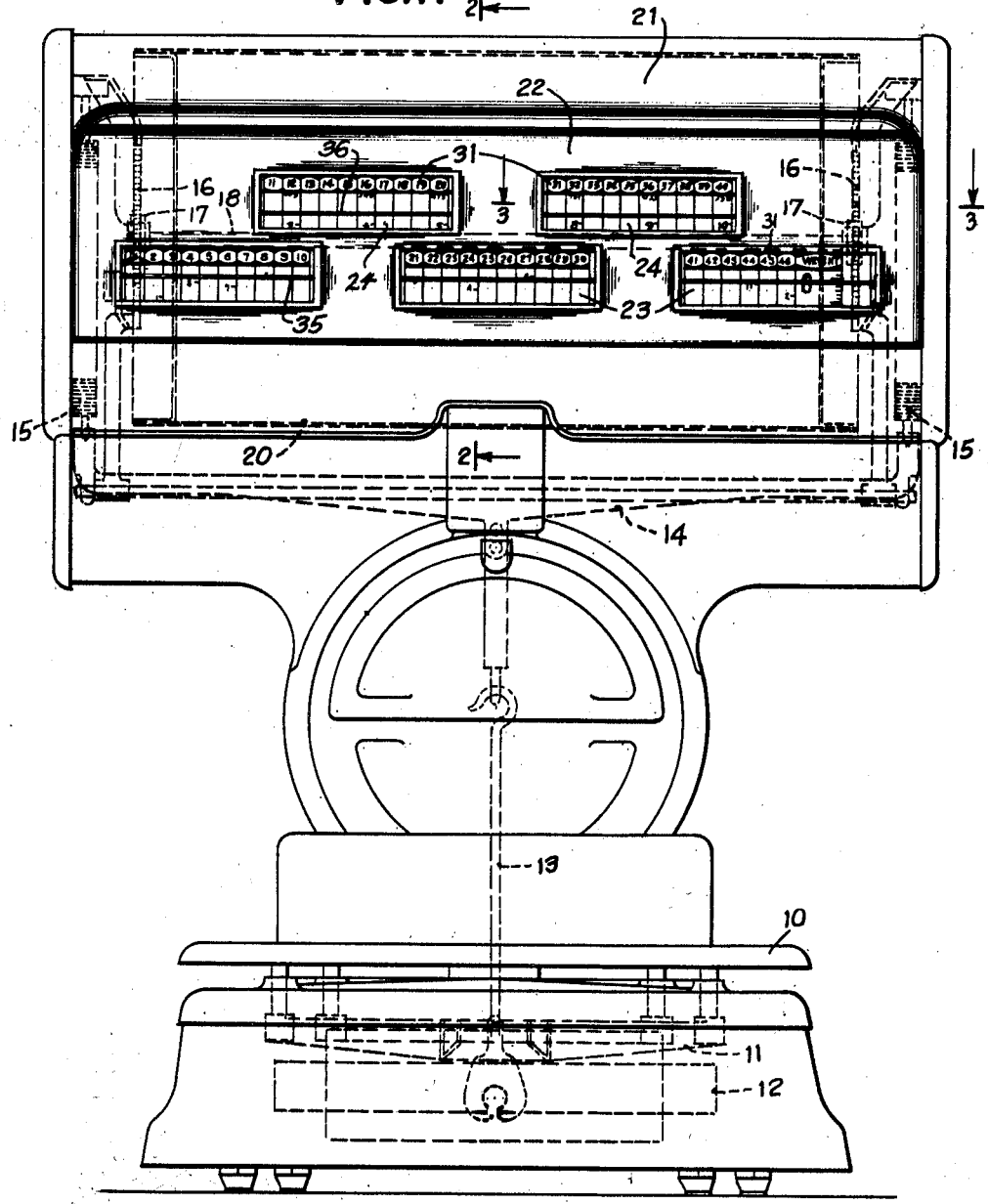
Fig. 1 is a front view of the scale embodying the invention.
Figure 2:
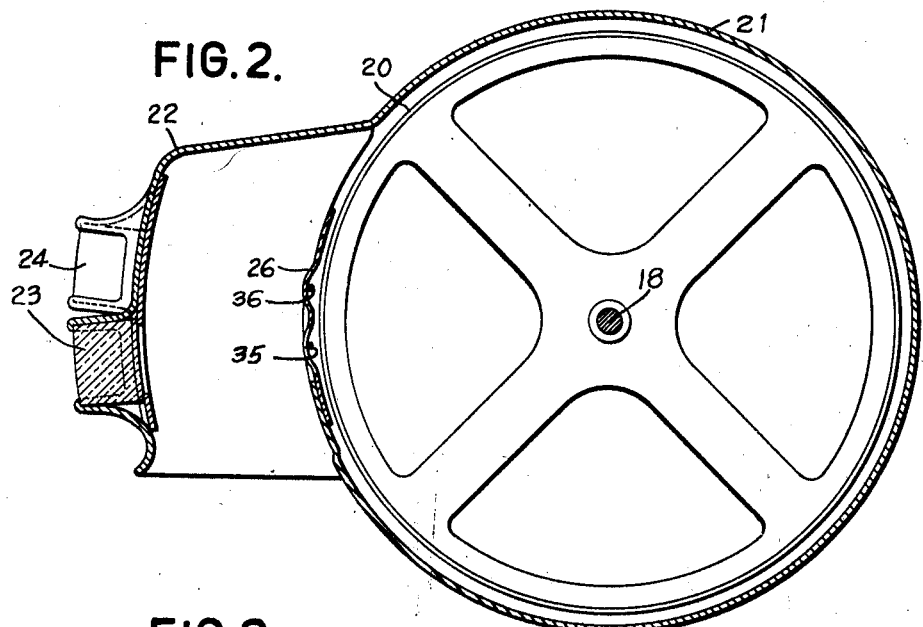
Fig. 2 is a section on line 2—2 of Fig. 1.
Figure 3:
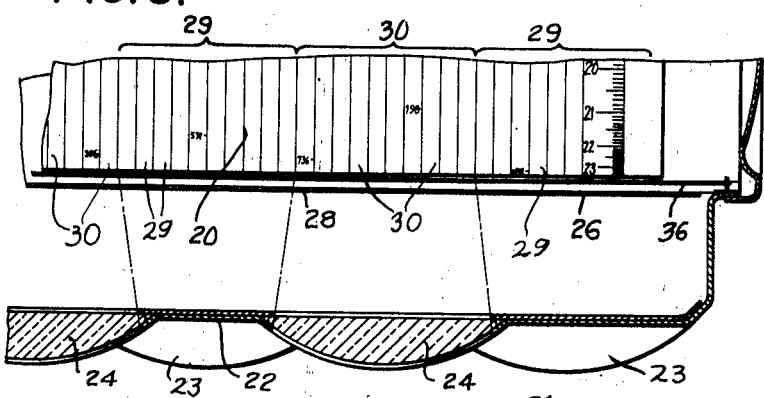
Fig. 3 is a section on line 3—3 of Fig. 1.
Figure 4:
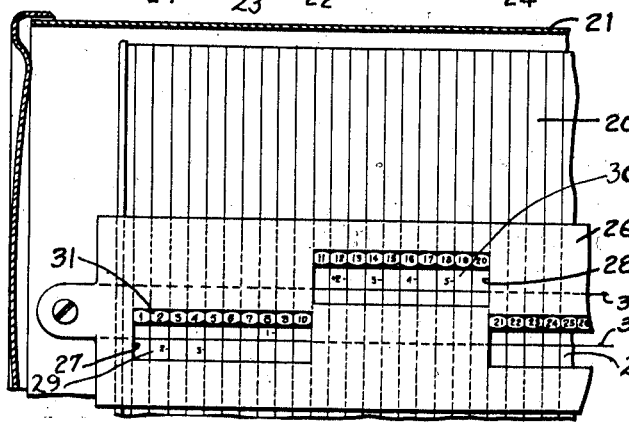
Fig. 4 is a detail of the chart and the price face with the magnifying lens removed.

The scale comprises a platform 10 carried by a spider 11 which is supported by a base lever 12 of the second order. The lever is connected through a vertical rod 13 to the horizontal draft device 14 which at opposite ends is connected to coil springs 15 and racks 16. The racks 16 drive pinions 17 on the shaft 18 of the cylinder or drum chart 20. For a complete understanding of the above construction, attention is directed to Patent No. 1,690,258, owned by the assignee of the instant case.

The housing of the scale includes a head portion 21 which surrounds the chart and the upper half of which at the merchant side is formed with a cowl 22 extending forwardly of the chart and horizontally towards the platform. Fixed into the front of the cowl are spherically ground lenses 23 and lenses 24 horizontally and vertically staggered with respect to lenses 23. The lenses 23 extend in a horizontal row just below a horizontal radial line intersecting the chart and lenses 24 extend in a horizontal row just above this radial line, the two rows being separated by a narrow strip of the cowl front. Adjacent lenses 23 and 24 overlap each other to provide a full magnification of their respective chart fields, as will be explained more fully hereinafter.

The lower half of the chart housing 21 at the merchant side continues upwardly into the interior of the cowl 22 and is there provided with a combination price face and chart mask 26. The mask has openings 27 and 28 exposing fields 29 and 30 of value columns of the chart. The openings 27 alternate with openings 28 and are vertically offset with respect to each other, the openings 27 being horizontally behind lenses 23 and openings 28 being horizontally behind lenses 24. Unlike the adjacent lenses 23 and 24, the corresponding openings 27 and 28 of the mask do not overlap horizontally but terminate at adjacent ends in vertical alinement. Thus the last column of an exposed chart field 29 will be immediately followed without any gap by the adjacent column of the next field 30. Above each value column, the mask has a rate or unit price number 31 on the basis of which the column values have been calculated for different weights. Placing the rate figures above the openings 27 in conjunction with the blank space of the cowl between a pair of overlapping lenses 23 and 24 breaks up any apparent continuity of columns of fields 29 and 30 as viewed through their respective lenses.

As is well known, the closer an object is to the margins of a convex lens, the more distorted its virtual image will be due to aberration and the closer the object is to the central part of the lens, the clearer its image. For this reason, the smaller an object is with respect to the size of the reading lens, the clearer will be its magnified image. It is thus necessary, if the chart fields 29 and 30

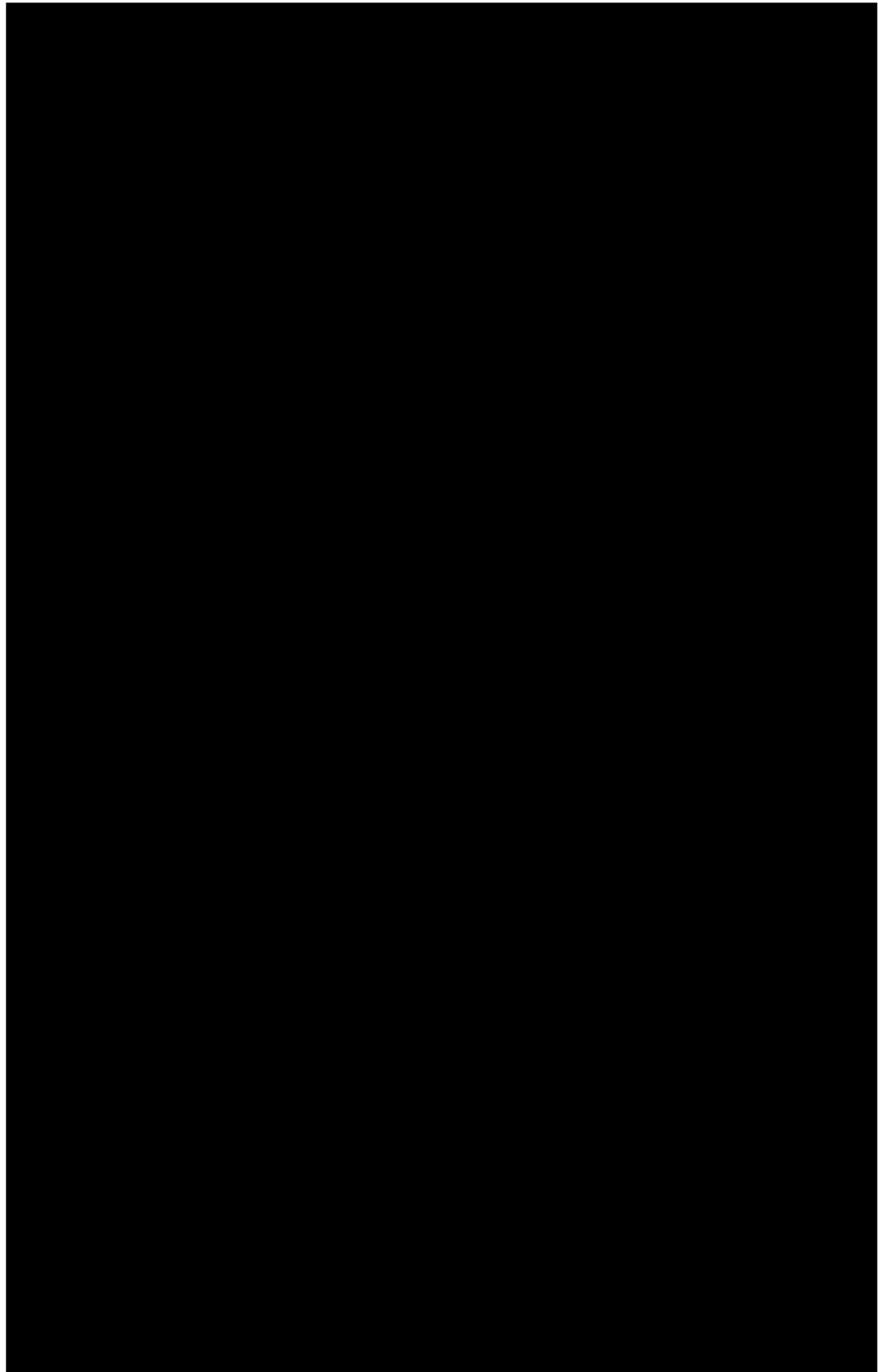

magnifying lens elements, each coacting with one field, and each overlapping the adjacent lens to extend beyond each side of its field to provide a full magnification thereof.

7. A scale having a load support, load resisting means operated thereby, registering mechanism including chart and index means relatively movable in a vertical direction under control of the resisting means, the chart means comprising a pair of horizontally arranged and adjacent indicating fields, each field having its zero line vertically spaced from the zero line of the other field, horizontally arranged magnifying devices, each coacting with one field, and carried by the scale in vertically spaced relationship similarly to the spacing of the zero lines of their fields, the devices overlapping horizontally to extend beyond the width of their corresponding fields to obtain full horizontal magnification of each field.

8. As a subcombination, a chart having abutting staggered fields with adjacent fields effectively isolated from each other, means for carrying the chart, and similarly staggered lens elements carried by said means each in front of one of the fields for magnifying only said field, each of said lens elements overlapping adjacent lens elements and extending beyond the width of its associated field to provide full magnification thereof in all directions.

9. As a subcombination, a chart having abutting vertically staggered indicating fields, means for carrying the chart, and spherically ground lens elements carried by said means in similarly staggered relationship, each element in front of one of the fields for magnifying only said field in all directions, and masking means for the chart having a separate opening between each lens and the chart isolating each lens field from adjacent lens fields.

10. As a subcombination, a chart having adjacent staggered indicating fields, means for carrying the chart, and spherically ground lens elements carried by said means in similarly staggered relationship, each element in front of one of the fields and overlapping the adjacent element to extend beyond the width of its associated field to provide full magnification thereof in all directions.

11. A scale having a load support, load resisting means, a rotary drum chart having its entire width covered by weight proportional indications and controlled by the load resisting means, a housing for the chart, and a series of spherically ground lens elements carried by the housing with some of said elements arranged in one row with their effective magnifying parts spaced apart along said row and others of said elements arranged in an adjacent row with their effective magnifying parts also spaced apart along the latter row, the two rows being spaced apart in a direction transverse to the width of the chart, the elements of one row overlapping, in the direction in which the rows extend, adjacent elements of the other row whereby said elements of both rows serve to fully magnify the whole width of the chart.

12. A scale having a load support, load resisting means, a rotary drum chart controlled by the resisting means and having adjacent indicating fields, each with its zero line spaced in the direction of movement of the chart from the zero line of the adjacent field, similarly spaced indexes, one for each field, a housing for the chart, and adjacent magnifying lenses carried by the housing, spaced similarly to the indexes and overlapping each other in a direction transverse to movement of the chart and each in front of one of said fields for providing a full magnification of the indexed portion of the associated field in the direction transverse to movement of the chart.

13. A scale having a load support, load resisting means, a rotary drum chart controlled by the resisting means and having a plurality of adjacent indicating fields, adjacent fields having their datum lines spaced apart in the direction of movement of the chart, correspondingly spaced indexes for the adjacent fields, a housing for the chart, and a plurality of spherically ground magnifying lens elements carried by the housing in staggered relationship each element being in front of one field and wider than its associated field, adjacent elements overlapping each other in the direction of width of the fields and being spaced in the direction of spacing of the indexes to permit them to overlap.

14. The scale as defined in claim 13, each field having a plurality of columns of indications based on different unit rates, and a plurality of unit rate indicating elements, each visible through one of the lens elements in coacting relationship with the columns of the field viewed through said element.

15. The scale as defined in claim 13, and means for isolating a field from all the lens elements but the one in front of it.

16. Means for magnifying an area in a certain direction, comprising a plurality of staggered magnifying elements formed to magnify the area in said direction, adjacent elements being relatively spaced transversely to aforesaid direction and overlapping one another in aforesaid direction so that thereby each element is wider in said direction than the portion of the area viewed therein and the elements without distortion substantially equally magnify adjacent portions of the area in said direction.

17. In a device of the character described, in combination, a chart having adjacent staggered fields of indications, magnifying means for simultaneous viewing of all of the fields comprising a lens element for each field, said lens elements being each wider than a corresponding field and positioned in staggered relationship similar to the fields of indications, and masking means adjacent the chart having a plurality of openings corresponding in number to the fields and each corresponding in width to the width of a field, said lens elements magnifying the fields in the direction of their width and the masking means limiting the scope of each lens element to the width of a field.

EDWARD J. VON PEIN.